No. 742,203. PATENTED OCT. 27, 1903.
L. J. LINDSAY.
MARKER FOR CORN PLANTERS.
APPLICATION FILED JAN. 13, 1903.
NO MODEL.
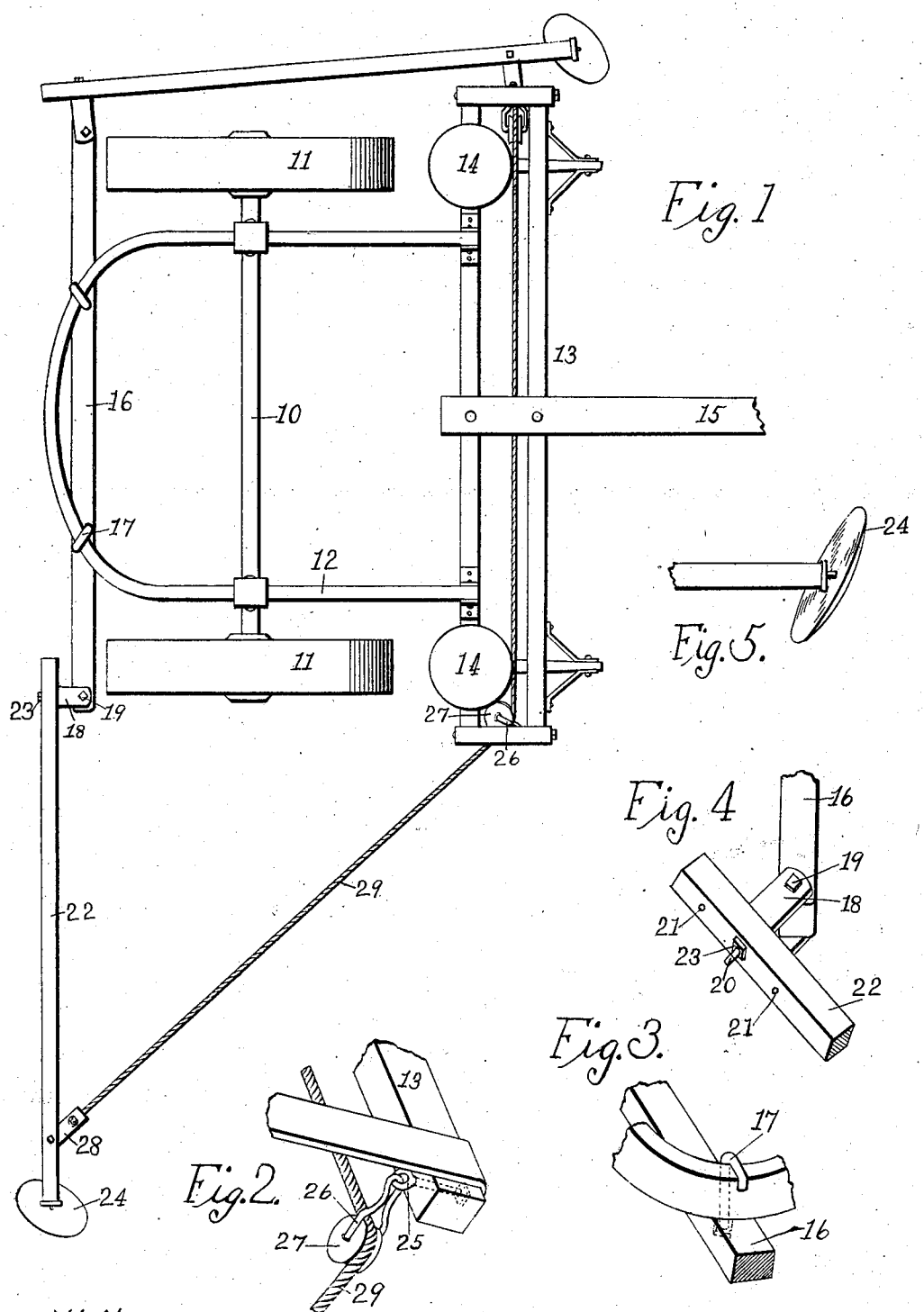
Witnesses
Karl K. Keffer
L. L. Leibrock
Inventor, Leroy J. Lindsay.
by Orwig & Lane Attorneys.

No. 742,203. Patented October 27, 1903.

UNITED STATES PATENT OFFICE.

LEROY J. LINDSAY, OF SEYMOUR, IOWA.

MARKER FOR CORN-PLANTERS.

SPECIFICATION forming part of Letters Patent No. 742,203, dated October 27, 1903.

Application filed January 13, 1903. Serial No. 138,942. (No model.)

*To all whom it may concern:*

Be it known that I, LEROY J. LINDSAY, a citizen of the United States, residing at Seymour, in the county of Wayne, State of Iowa, have invented a new and useful Marker for Corn-Planters, of which the following is a specification.

This invention relates to that class of markers in which two marker-arms are pivotally attached to the opposite sides of the rear end portion of the corn-planter frame, their free ends being connected by means of a rope, the parts being so arranged that when the machine is advanced in one direction across the field one of the marker-arms projects substantially at right angles to the machine-frame and marks the ground for the next row, the other arm being carried along the side of the machine-frame and above the ground, and then when the machine-frame is turned at the end of the field the marker-arm resting upon the ground remains stationary until the other arm drops by gravity and engages the ground-surface. Then as the planter is further turned the other arm automatically moves to a position at right angles to the machine-frame with its end resting on the ground, while the first-mentioned arm is automatically drawn by a rope to a position parallel with the machine-frame.

The objects of my invention are to provide a device of this class of simple, durable, and inexpensive construction that may be readily, quickly, and easily attached to a corn-planter—that is to say, the invention is designed with the object of providing a device of this class which may be manufactured and sold to owners of corn-planters as an attachment which will fit corn-planters of any ordinary size or shape and can be attached without the necessity of altering either the corn-planter or the attachment in any way.

A further object is to provide a disk marker especially adapted for work of this class and so designed that when being drawn across a field it cannot enter the ground to such an extent as to stick in the ground and is also so shaped that when it strikes a furrow running at right angles to the line of advance of the planter the disk will rise out of the furrow and follow the contour of the ground-surface.

A further object is to provide a device of this class having a marker-arm that may be readily and quickly adjusted as to length, so that the indicating-furrow may be made at any desirable distance from the previous one.

My invention consists in certain details in the construction, arrangement, and combination of the various parts of the device, whereby the objects above contemplated are attained, as hereinafter more fully set forth, pointed out in my claim, and illustrated in the accompanying drawings, in which—

Figure 1 shows a top or plan view of a planter-frame with my improved marker applied thereto as in practical use. Fig. 2 shows a detail perspective view illustrating one of the guide-pulleys for the marker-rope and its means of attachment to the frame. Fig. 3 shows a detail perspective view illustrating the means by which the marker-arm support is attached to the planter-frame. Fig. 4 shows a detail perspective view illustrating the joint by which the marker-arm is attached to the marker-arm support. Fig. 5 shows a detail perspective view of one of the marker-disks.

Referring to the accompanying drawings, I have used the reference-numeral 10 to indicate the planter-axle, having the supporting-wheels 11 thereon. The numeral 12 indicates the main frame supported upon the axle 10, and 13 indicates the front portion of the frame supporting the seedboxes 14, and 15 indicates the tongue fixed to the machine. These parts just described are of the ordinary construction, and the frame-body 12 in some makes of machines is angular and in others it is rounded, as shown in the drawings. My improved marker-arm support is adapted for use with any form which this frame may assume.

The marker-arm support is indicated by the reference-numeral 16 and is preferably a straight wooden bar of a length slightly greater than the length of the axle 10. It is attached to the machine-frame by means of the hooked rods 17, which rods pass vertically through the support 16 and are rotatable relative to the support. On the lower end of each rod 17 is a nut, by which the hooked rod may be firmly clamped in position in engagement with the machine-frame 12. In use the support is placed under the rear end of the machine-frame, the hooked rods 17 passing over the machine-frame, and then the nuts on the hooked rods are screwed up until the support is firmly clamped in position with its ends projecting slightly beyond the wheels 11. By this means the support may be accurately centered and firmly fixed to the machine-frame.

On each end of the support is a marker-arm, comprising the following parts: The numeral 18 indicates a yoke connected with the support by the bolts 19, which permit the yoke to move on the support in a horizontal plane. Formed on the yoke is a screw-threaded extension 20 to pass through one of a series of openings 21 in the marker-arm 22, and a nut 23 is placed on the extension 20, thus securing the marker-arm to the yoke and permitting movement of the marker-arm relative to its support in a vertical plane. By this means a connection is provided between a marker-arm and its support which permits of universal movement of the marker-arm. Furthermore, the marker-arm may be adjusted by placing the screw-threaded extension 20 in different ones of the openings 21, so that the furrow made by the marker may be located at any desirable distance from the machine-frame. The marker at the outer end of the marker-arm is a concavo-convex disk 24, which is rotatably supported at the outer end of the marker-arm in a peculiar manner, as follows: Assuming the marker-arm to be at its outer limit of movement and the disk resting on the ground-surface, its upper end inclines outwardly from the machine-frame and its forward end inclines away from a fore-and-aft line, so that as the disk is being advanced over the ground-surface in the position indicated it will cut a furrow in the ground-surface, and assuming that the machine-frame is being turned toward the disk the said disk will cut into the ground sufficiently to hold it in position, and, furthermore, the disk will readily ride over obstructions on the ground-surface or furrows formed in the ground.

It is to be understood that a marker-arm is provided at each end of the support 16 and that these arms are connected by a rope which passes over the supports at the front of the machine-frame. I have provided means whereby the rope may be supported in this position by means of pulleys, which may be attached to the machine-frame without the necessity of providing special bolt-openings for the pulleys and in such a manner that the rope will not engage any of the parts of the machine-frame, and thus be quickly worn out.

The reference-numeral 25 indicates an eye-bolt having the link 26 passing through its eye and a direction-pulley 27 supported by the link.

The numeral 28 indicates a short metal strap pivoted to the outer end of the marker-arm. It is to be understood in this connection that a similar strap 28 is attached to each marker-arm and a pulley 27 is supported to each side of the machine-frame.

The numeral 29 indicates a rope with its ends fixed to the straps 28 and its center portion passed over the pulleys 27. It is to be understood in this connection also that at the forward end of a planter-frame there are a number of bolts required for securing the various parts together, and in attaching my device to a planter I remove one of these bolts at each side of the machine and place in its stead one of the bolts 25 to support the pulleys, and in doing this I select a bolt so positioned that when the pulley is supported therein the rope will not rub upon any of the planter parts. This may be done without in any way weakening the machine-frame, because the bolts 25 take the place of the bolts that have been removed.

In practical use I first attach the marker-arm support to the rear end of the planter-frame by means of the two hooked rods, as before described. I then remove two bolts from the front of the marker-frame and substitute the pulley-supporting bolts. I then attach the rope to the straps on the marker-arms and run it through the pulleys. This rope is of such length that when one marker-arm is in position substantially at right angles to the machine-frame the other marker-arm is supported above the ground-surface and resting against the adjacent pulley. Each marker-arm is adjusted to stand at the desired distance from the planter-wheel as required to make a furrow at the proper distance from the planter.

In practical use the planter is advanced over the ground-surface in the ordinary way, and the marker forms a furrow parallel with the line of advance. When at the end of a furrow, the planter is turned toward the marker, which rests on the ground-surface, whereupon the rope is slackened, the other marker permitted to drop to the ground-surface, and as one marker moves toward its pulley the other moves away from it, so that the operator need not pay any attention whatever to the marker, as one arm is automatically withdrawn and the other extended by the act of turning the planter around at the end of the furrow.

Having thus described my invention, what I claim, and desire to secure by Letters Patent of the United States therefor, is—

The combination with a planter-frame, of a cross-piece, two hooks overlapping the rear end of the frame and passed through the cross-piece and screw-threaded at their lower ends, nuts on said lower ends, a substantially Y-shaped bracket pivoted to each end of the cross-piece, a marker-arm adjustably pivoted to each of said brackets, a marker at the outer end of each arm, and a rope attached to the marker-arms and slidingly connected with the forward part of the planter-frame, substantially as and for the purposes stated.

LEROY J. LINDSAY.

Witnesses:
J. S. STAMPS,
J. T. MAGEE.